United States Patent
Ito et al.

(10) Patent No.: US 10,041,664 B2
(45) Date of Patent: Aug. 7, 2018

(54) COOLING APPARATUS, LIGHT SOURCE APPARATUS INCLUDING COOLING APPARATUS, AND PROJECTION-TYPE IMAGE DISPLAY APPARATUS INCLUDING LIGHT SOURCE APPARATUS

(71) Applicant: Mitsubishi Electric Corporation, Tokyo (JP)

(72) Inventors: Daisuke Ito, Tokyo (JP); Takashi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 15/309,240

(22) PCT Filed: Jun. 6, 2014

(86) PCT No.: PCT/JP2014/065146
§ 371 (c)(1),
(2) Date: Nov. 7, 2016

(87) PCT Pub. No.: WO2015/186257
PCT Pub. Date: Dec. 10, 2015

(65) Prior Publication Data
US 2017/0074501 A1    Mar. 16, 2017

(51) Int. Cl.
*F21V 29/503*    (2015.01)
*F21V 29/52*    (2015.01)
(Continued)

(52) U.S. Cl.
CPC ............ *F21V 29/52* (2015.01); *F21V 29/503* (2015.01); *F21V 29/90* (2015.01); *F25B 1/00* (2013.01);
(Continued)

(58) Field of Classification Search
CPC ........ F25D 21/002; F25D 21/08; F21V 29/52; F21V 29/503; F21V 29/90; F25B 1/00;
(Continued)

(56) References Cited

U.S. PATENT DOCUMENTS

| 6,354,370 B1* | 3/2002 | Miller | F25B 19/00 165/263 |
|---|---|---|---|
| 2009/0217684 A1* | 9/2009 | Ouchi | F25D 21/002 62/155 |
| 2011/0037954 A1 | 2/2011 | Tsuchiya et al. | |

FOREIGN PATENT DOCUMENTS

| JP | 08-014670 A | 1/1996 |
|---|---|---|
| JP | 2001-203308 A | 7/2001 |

(Continued)

OTHER PUBLICATIONS

Extended European Search Report dated Sep. 7, 2017 issued in corresponding EP patent application No. 14893727.9.
Office Action dated Oct. 4, 2016 in the corresponding Japanese Patent Application No. 2016-525657 (and English translation).
International Search Report of the International Searching Authority dated Sep. 9, 2014 for the corresponding international application No. PCT/JP2014/065146 (and English translation).
(Continued)

*Primary Examiner* — Bao Q Truong
*Assistant Examiner* — Fatima Farokhrooz
(74) *Attorney, Agent, or Firm* — Posz Law Group, PLC

(57) ABSTRACT

A cooling apparatus includes: a refrigerant circuit in which a compressor, a condenser, an expansion valve and an evaporator are circularly connected sequentially, via a pipe, and a refrigerant circulates; and a heater provided to the refrigerant circuit, in which the evaporator is thermally connected to an exothermic element.

7 Claims, 3 Drawing Sheets

(51) Int. Cl.
  *F25B 1/00* (2006.01)
  *G03B 21/14* (2006.01)
  *G03B 21/16* (2006.01)
  *F21V 29/90* (2015.01)
  *F25D 21/00* (2006.01)
  *F25D 21/08* (2006.01)

(52) U.S. Cl.
  CPC ........... *F25D 21/002* (2013.01); *F25D 21/08* (2013.01); *G03B 21/14* (2013.01); *G03B 21/16* (2013.01)

(58) Field of Classification Search
  CPC ........... F25B 2400/073; F25B 2400/06; G03B 21/14; G03B 21/16; G03B 21/005; G03B 21/2013; G03B 21/2033; H05K 7/20354; H04N 9/3144; H01L 23/427; H01L 23/473; H01L 2924/0002; H01L 2924/00
  See application file for complete search history.

(56) References Cited

FOREIGN PATENT DOCUMENTS

| | | |
|---|---|---|
| JP | 2006-242480 A | 9/2006 |
| JP | 2008-121985 A | 5/2008 |
| JP | 2009-042703 A | 2/2009 |
| JP | 2009-086269 A | 4/2009 |
| JP | 2009-086272 A | 4/2009 |
| JP | 2009-163075 A | 7/2009 |
| JP | 2009-258670 A | 11/2009 |
| JP | 2010-085676 A | 4/2010 |

OTHER PUBLICATIONS

Office Action dated Apr. 18, 2017 issued in corresponding JP patent application No. 2016-525657 (and English translation).

Japanese Office Action dated Oct. 4, 2016 in the corresponding JP application No. 2016-525657. (English translation attached).

\* cited by examiner

COOLING APPARATUS, LIGHT SOURCE APPARATUS INCLUDING COOLING APPARATUS, AND PROJECTION-TYPE IMAGE DISPLAY APPARATUS INCLUDING LIGHT SOURCE APPARATUS

CROSS REFERENCE TO RELATED APPLICATION

This application is a U.S. national stage application of PCT/JP2014/065146 filed on Jun. 6, 2014, the contents of which are incorporated herein by reference.

TECHNICAL FIELD

The present invention relates to a cooling apparatus, a light source apparatus including the cooling apparatus, and a projection-type image display apparatus including the light source apparatus.

BACKGROUND ART

Hitherto, there have been known projection-type image display apparatus including a light source, an optical modulator configured to modulate light emitted from the light source, and a projection unit configured to project, on a projection surface, the light being modulated by the optical modulator.

In many cases, the related-art projection-type image display apparatus employ a lamp as a light source configured to generate light of three primary colors, and are configured to separate white light, which is emitted from the lamp, with a dichroic mirror into three primary colors: red (R), green (G), and blue (B), modulate the three primary colors based on image information, synthesize the modulated colors with a synthesizing prism, and display the resultant on a screen through a projection lens.

In recent years, demands for a still higher luminance (higher output), a wider color gamut, and a longer life have been increased. However, it is difficult to achieve a still higher luminance with a lamp light source because the lamp light source causes problems such as increase in heat generation amount, increase in cooling structure in size, noise, and increase in power source in size. It is also difficult to achieve a wider color gamut and a longer life with a lamp light source.

In view of the above, in recent years, there have been developed, instead of a lamp light source, light sources using a plurality of semiconductor lasers or LEDs having a wide color gamut and long life as light source elements, thereby being capable of obtaining high output, and projection-type image display apparatus using such light sources.

In order to cause semiconductor lasers, LEDs, and other elements of respective colors (R, G, and B) to stably emit light or oscillate, it is important to keep operating setting temperatures thereof constant. When a light source element is a semiconductor laser, the light emission efficiency of the semiconductor laser increases as the temperature of the semiconductor laser decreases. In general, Peltier elements are used in a technology for cooling semiconductor lasers. However, heat loads of those elements are large, and hence there arise problems such as increase in heat pipe and heat sink in size, increase in noise due to increased air volume of fans, and increase in power consumption.

Meanwhile, a cooling method using water cooling can suppress heat loads as compared to a case of using Peltier elements. However, there is a significant difference between the temperatures of water at an inlet of a cooler and at an outlet thereof, and hence temperatures of a plurality of semiconductor lasers cannot be kept constant. As a result, stable output light cannot be supplied.

As one method for solving the problems described above, there has been proposed a method in which a cooling apparatus including a refrigerant circuit including a compressor, a condenser, a fan, a pressure reducer, and an evaporator (cooler) is used, and latent heat generated by vaporization of refrigerant is utilized (for example, see Patent Literatures 1 and 2).

In Patent Literature 1, there is proposed a system in which temperature is kept constant by connection of refrigerant pipes to light source elements directly or indirectly through heat pipes. Meanwhile, in Patent Literature 2, there is proposed a system in which temperature is adjusted by controlling heating units provided to light source elements.

CITATION LIST

Patent Literature

Patent Literature 1: Japanese Unexamined Patent Application Publication No. 2009-042703 (for example, see [0025] to [0028], and FIG. 2)
Patent Literature 2: Japanese Unexamined Patent Application Publication No. 2009-086269 (for example, see [0026] to [0029], and FIG. 3)

SUMMARY OF INVENTION

Technical Problem

In Patent Literature 1, no heating unit is provided on a cooling apparatus side, and hence a refrigerant temperature is decreased when the apparatus is activated and a cooling (cooling apparatus) side is activated before a heat source (light source element) side. When the refrigerant temperature reaches a dew point or less, dew condensation occurs in the apparatus to cause short-circuit in the apparatus, leading to apparatus failure. Further, when the apparatus is activated and the heat source side is activated before the cooling side, temperatures of the light source elements are increased due to insufficient supply of refrigerant, leading to apparatus failure. In addition, refrigerant, which is not evaporated in the cooler and is thus in a liquid state, flows into the compressor, leading to compressor failure. Thus, decrease in reliability of the apparatus is a problem.

In Patent Literature 2, the heating units are directly provided to the light source elements, and hence temperatures of the light source elements are increased when a heating amount of the heating units is larger than a heat generation amount of the light source elements, thereby disadvantageously shortening the lives of the elements. In addition, a heating amount is determined based only on temperatures of the light source elements, and hence a state of refrigerant on a suction side of the compressor cannot be determined. As a result, refrigerant in a liquid state often returns to the compressor, leading to problematic compressor failure.

The present invention has been made in view of the problems as described above, and has an object to provide a cooling apparatus, a light source apparatus including the cooling apparatus, and a projection-type image display apparatus including the light source apparatus, the cooling apparatus being capable of improving the reliability of an apparatus having an exothermic element mounted thereon, to which the cooling apparatus is connected.

Solution to Problem

According to one embodiment of the present invention, there is provided a cooling apparatus including: a refrigerant circuit in which a compressor, a condenser, an expansion valve and an evaporator are circularly connected sequentially, via a pipe, and a refrigerant circulates; and a heater provided to the refrigerant circuit, in which the evaporator is thermally connected to an exothermic element.

Advantageous Effects of Invention

The cooling apparatus according to one embodiment of the present invention includes the heater, and hence dew condensation in the apparatus having the exothermic element mounted thereon, with which the cooling apparatus is thermally connected, can be prevented. As a result, the apparatus failure can be prevented, and the reliability of the apparatus can thus be improved.

DESCRIPTION OF EMBODIMENTS

Figure 1:
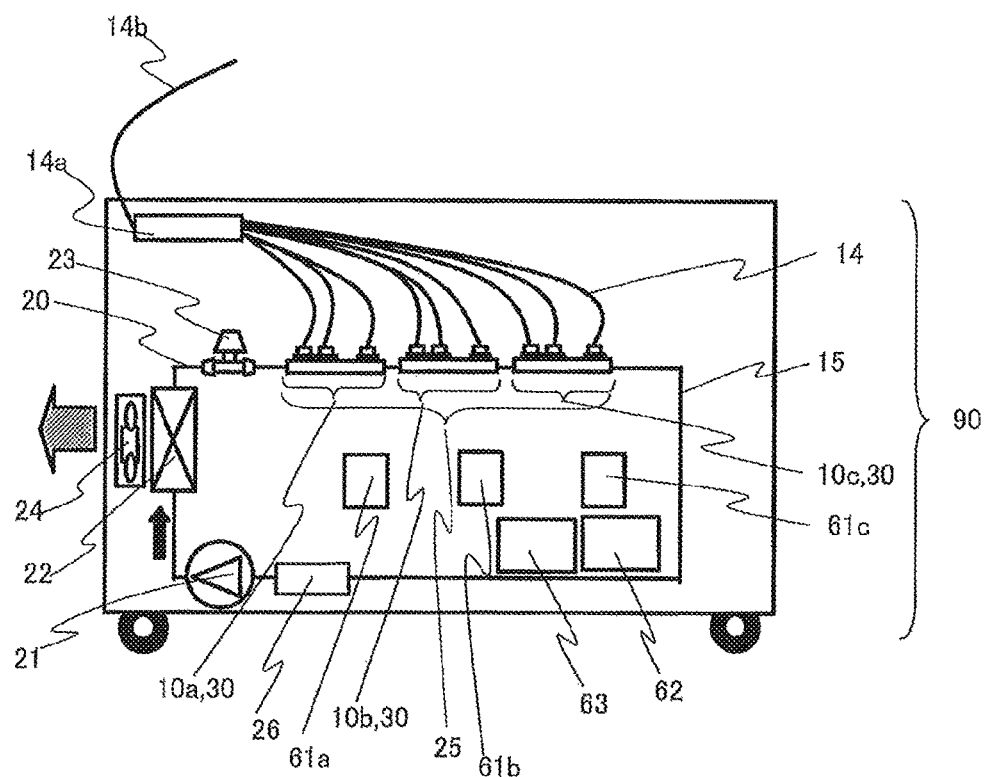
FIG. 1 is an overall configuration diagram of a light source apparatus including a cooling apparatus according to Embodiment 1 of the present invention.

Embodiments of the present invention are described below with reference to the drawings. Note that, the present invention is not limited to the embodiments described below. Moreover, in the drawings referred to below, the size relationship between components may be different from reality in some cases.

Embodiment 1

Figure 2:
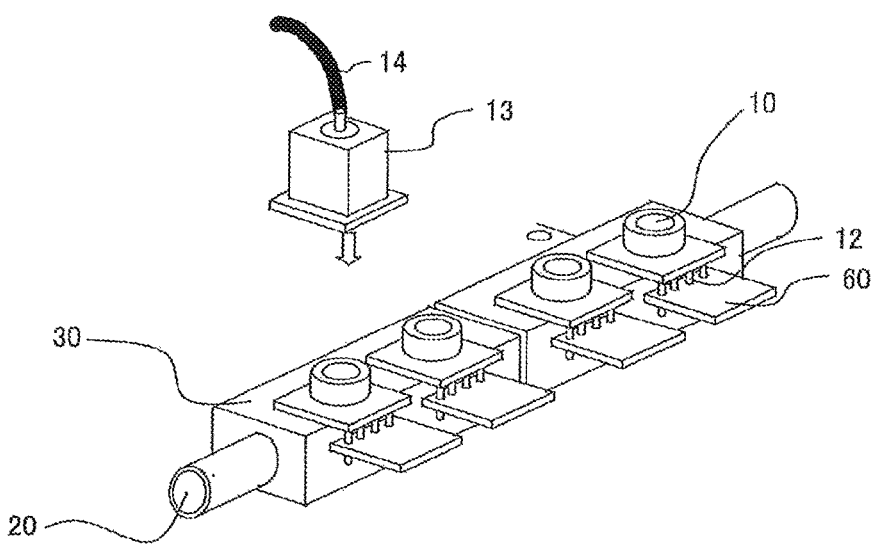
FIG. 2 is an enlarged view of main parts of the cooling apparatus according to Embodiment 1 of the present invention.

FIG. 1 shows a general schematic configuration of a light source apparatus 90 including a cooling apparatus 15 according to Embodiment 1 of the present invention, and FIG. 2 is an enlarged view of main parts of the cooling apparatus 15 according to Embodiment 1 of the present invention.

In the description of Embodiment 1, an electronic apparatus that the cooling apparatus 15 cools is the light source apparatus 90.

The light source apparatus 90 according to Embodiment 1 includes laser light source modules 10, optical units 13, optical fibers 14, an optical fiber collecting portion 14a, an optical fiber bundle line 14b, a cooling apparatus 15, heat blocks 30, electric boards 60, laser light source driving circuit boards 61, a power source circuit board 62, and a control circuit board 63.

The laser light source modules 10 include a green laser light source module 10a configured to emit green (G) laser light, a red laser light source module 10b configured to emit red (R) laser light, and a blue laser light source module 10c configured to emit blue (B) laser light.

Further, the laser light source driving circuit boards 61 include a green laser light source driving circuit board 61a, a red laser light source driving circuit board 61b, and a blue laser light source driving circuit board 61c configured to drive the laser light source modules 10 of the respective colors (R, G, and B). The laser light source modules 10 each correspond to an "exothermic element" of the present invention. Further, the red laser light source module 10b and the blue laser light source module 10c each correspond to a "unit laser light source module" of the present invention.

Further, the laser light source modules 10 each include an electric terminal portion 12, and are configured to emit laser light when being supplied with electricity via the electric board 60. Then, the emitted laser light is guided to the optical fiber 14 via the optical unit 13.

The optical fibers 14 are connected to the laser light source modules 10 of the respective colors. Laser light emitted from the laser light source modules 10 is output to the outside of the laser light source through the optical fibers 14, the optical fiber collecting portion 14a, and the optical fiber bundle line 14b.

The power source circuit board 62 is a circuit board configured to supply power to the light source apparatus 90. The control circuit board 63 is a circuit board configured to control the light source apparatus 90. The control circuit board 63 corresponds to a "controller" of the present invention.

The cooling apparatus 15 includes a refrigerant circuit in which a compressor 21, a condenser 22, an expansion valve 23, and an evaporator 25 configured to cool the laser light source modules 10 are circularly connected sequentially, via a pipe 20, and refrigerant circulates. Further, a fan 24 for ventilation is provided to the condenser 22.

Refrigerant flows through the pipe 20. A plurality of heat blocks 30, which are radiators, are mounted on the pipe 20 between the expansion valve 23 and the compressor 21. The evaporator 25 is formed by a segment of the pipe 20 between the expansion valve 23 and the compressor 21, and the heat blocks 30. Further, the laser light source modules 10 are joined to the heat blocks 30. That is, the pipe 20 and the laser light source modules 10 are thermally connected to each other via the heat blocks 30. The laser light source modules 10 are cooled by refrigerant flowing through the pipe 20.

Specifically, high-temperature and high-pressure refrigerant compressed in the compressor 21 exchanges heat with outside air, which is ventilated due to the working of the condenser 22 and the fan 24, to decrease its temperature, thereby becoming low-temperature and high-pressure refrigerant. At the same time, the condensing heat is rejected to the outside of the light source apparatus 90 by the fan 24. Next, the refrigerant is decompressed by the expansion valve 23, and then takes away heat by absorbing evaporation latent heat (that is, cools the laser light source module 10), thereby becoming low-temperature and low-pressure refrigerant. This occurs when the refrigerant flows through the pipe 20, on which the heat blocks 30 are mounted with the laser light source modules 10 joined thereto. Through the series operation of what is called heat pump operation, heat generated by the laser light source modules 10 is continuously rejected to the outside of the light source apparatus 90, thereby keeping temperatures of the laser light source modules 10 constant.

Due to this action of the refrigerant circuit, a refrigerant temperature in the pipe 20 of FIG. 2, on which the heat blocks 30 are mounted, is decreased to a peripheral temperature of the pipe 20 or less. Further, a temperature of the surface of the pipe 20 on a low-pressure side (the suction side of the compressor 21) is decreased to approximate the refrigerant temperature. Further, temperatures at joints between the laser light source modules 10 and the heat blocks 30 are increased due to heat generated from the laser light source modules 10, but surfaces of the heat blocks 30 other than the joints are less affected by heat. Thus, the temperatures of the surfaces are decreased to approximate the refrigerant temperature. Then, when those temperatures reach a dew point or less, dew condensation occurs on the pipe 20 on the low-pressure side and the surfaces of the heat blocks 30.

In order to prevent such dew condensation, in Embodiment 1, the refrigerant circuit, namely, the cooling apparatus 15 includes the heater 26. Through control of the heater 26, the refrigerant temperature is adjusted so as not to reach the dew point or less, thereby preventing dew condensation. When the apparatus is activated and the compressor 21 of the cooling apparatus 15 is activated first, temperatures of the pipe 20 and the heat blocks 30 are decreased because the light source modules do not generate heat yet, and hence dew condensation occurs on the surfaces of those components. On the other hand, when the laser light source modules 10 are activated first, temperatures of the laser light source modules 10 are immediately increased because the compressor 21 of the cooling apparatus 15 is not activated yet, thereby causing failure of the laser light source modules 10 or shortening the lives of the laser light source modules 10.

Accordingly, when the apparatus is activated, the heater 26 is activated first to warm the refrigerant. The compressor 21 is then activated such that the refrigerant temperature is adjusted so as not to reach the dew point or less. After that, the laser light source modules 10 are activated. In this manner, increase in temperature of the laser light source modules 10 is prevented.

Further, the heater 26 is provided, and hence refrigerant to be sucked into the compressor 21 can be turned into a vapor state at the same time as adjustment of an evaporating temperature of refrigerant. In this case, when the heater 26 is controlled such that refrigerant in the vapor state is sucked into the compressor 21, it is difficult to perform the simultaneous control as described above if the heater 26 is directly provided to the laser light source modules 10. Consequently, (when the discharge side of the compressor 21 corresponds to the upstream, and the suction side thereof corresponds to the downstream) refrigerant flowing near the blue laser light source module 10c of the laser light source modules 10, which is located on the most downstream side, may become superheated vapor and may not be cooled, or refrigerant not in the vapor state may be sucked into the compressor 21.

Accordingly, the heater 26 is provided in the refrigerant circuit on the low-pressure side (between the evaporator 25 and the suction port of the compressor 21 in Embodiment 1) so that refrigerant in the vapor state can be sucked into the compressor 21 while the evaporator 25 causes refrigerant in a wet state to flow. As a result, not only the reliability of the laser light source modules 10, but also the reliability of the compressor 21 can be improved.

Further, no dew condensation collecting container is needed, and a plurality of heaters 26 are not needed in the circuit. Thus, the apparatus can be manufactured at a low cost. The refrigerant temperature may be adjusted merely by controlling the heater 26 depending on a heat generation amount of the laser light source modules 10, based on the lowest pipe temperatures in the laser light source modules 10 and the suction temperature of the compressor 21, and hence the refrigerant temperature can be adjusted more easily than in a case of using a plurality of heaters 26.

Further, only one heater 26 is provided in Embodiment 1, and hence the cost can be reduced. Further, control of a plurality of heaters 26 is not needed, which means that the control is not complicated and the responsiveness of the apparatus can thus be improved.

Heaters 26 may be provided on the upstream side of the laser light source modules 10 and the downstream side thereof, respectively. With this configuration, an evaporating temperature of refrigerant can be adjusted by controlling the heater 26 on the upstream side, and a state of refrigerant to be sucked into the compressor 21 can be adjusted by controlling the heater 26 on the downstream side.

As described above, in the light source apparatus 90 including the cooling apparatus 15 according to Embodiment 1, the occurrence of dew condensation in the apparatus, which causes short-circuit in the apparatus 15, is prevented due to dew condensation prevention by the heater 26, and hence the light source apparatus 90 with high reliability is obtained.

Further, light emitting portion temperatures of laser diodes in the laser light source modules 10 are decreased, and hence the light source apparatus 90 has a characteristic of high opto-electric conversion efficiency. Thus, when the refrigerant temperature is decreased as described above, light output to the outside of the light source apparatus 90 is increased. As a result, the number of laser light source modules 10 necessary for obtaining light output that the light source apparatus 90 is required to output can be reduced, thereby reducing the cost of the light source apparatus 90.

Further, refrigerant to be sucked into the compressor 21 can be turned into the vapor state at the same time as the adjustment of the refrigerant temperature by the evaporator 25. Thus, the reliability of the compressor 21 can be improved.

In the description of Embodiment 1, the electronic apparatus that the cooling apparatus 15 cools is the light source apparatus 90. However, the electronic apparatus is not limited thereto, and may be an electronic apparatus having mounted thereon a heat generation element, for example, a personal computer.

Embodiment 2

Figure 3:
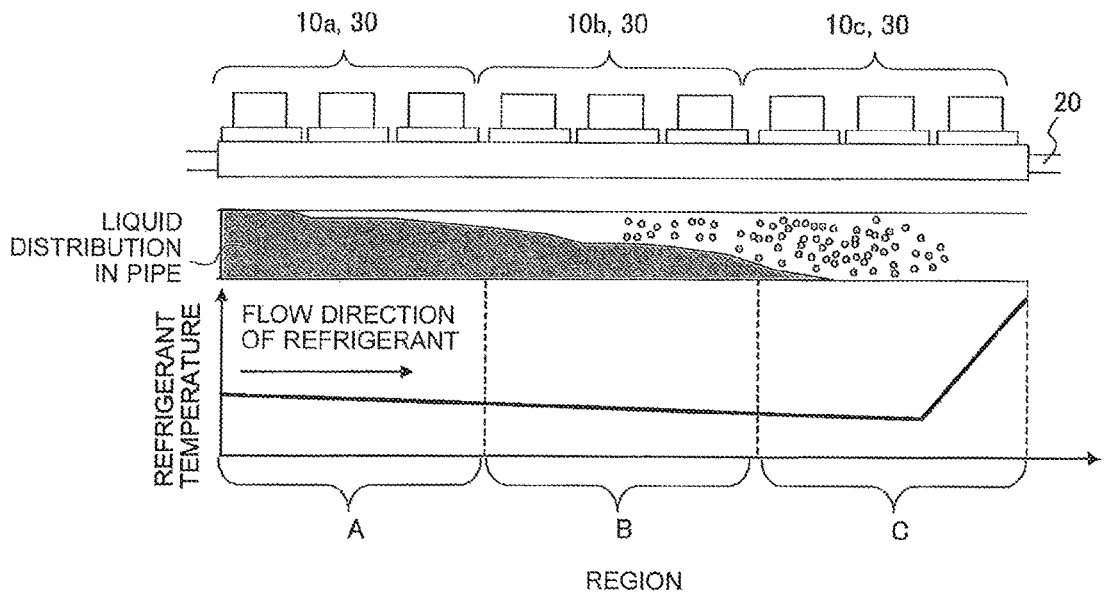
FIG. 3 is a diagram for illustrating laser light source modules of a light source apparatus according to Embodiment 2 of the present invention, and liquid dispersion therein.

FIG. 3 is a diagram for illustrating the laser light source modules 10 of the light source apparatus 90 according to Embodiment 2 of the present invention, and liquid dispersion therein.

Now, Embodiment 2 of the present invention is described. Description of the same component as that of Embodiment 1 is omitted herein. The parts identical with or corresponding to those of Embodiment 1 are denoted by the same reference symbols.

In Embodiment 1 described above, the light source apparatus 90 including the cooling apparatus 15 is described. In Embodiment 2, a case is described in which one of a plurality of laser light source modules 10 is configured to emit green laser light, and the green laser light source module 10a is arranged on the upstream side.

In FIG. 3, in the flow direction of refrigerant, the most upstream region is referred to as a region A, the most downstream region is referred to as a region C, and a region between the region A and the region C is referred to as a region B.

In Embodiment 2, as illustrated in the liquid dispersion in the pipe 20 of FIG. 3, a liquid volume of liquid refrigerant is increased in the order of region A>region B>region C for refrigerant in a two-phase gas-liquid state. In the region C, the liquid volume of the refrigerant is small and superheated vapor flows, and hence latent heat of the refrigerant is small. Thus, when the refrigerant is turned into the vapor-only state from the two-phase gas-liquid state, the refrigerant temperature is rapidly increased. Accordingly, in Embodiment 2, in the light source apparatus 90 in which a liquid volume of refrigerant has dispersion, the green laser light source module 10a, which has restriction on cooling temperature, is arranged on the upstream side (region A or region B), thereby keeping refrigerant in the two-phase gas-liquid state. In this manner, rapid increase in temperature of the green laser light source module 10a can be prevented, and the refrigerant temperature can be easily adjusted. When the green laser light source module 10a is arranged as close to the most upstream side as possible (region A), rapid increase in temperature of the green laser light source module 10a can be further prevented, and the refrigerant temperature can be easily adjusted. With the above-mentioned configuration, the reliability of the laser light source modules 10 can be improved and stable laser light can thus be emitted.

In Embodiment 2, as illustrated in FIG. 3, the laser light source modules 10 of the respective colors (R, G, and B) are arranged in line, but the arrangement is not limited thereto. The combination of colors and the number of laser light source modules 10 may differ from those of Embodiment 2. The laser light source modules 10 may be arranged in parallel to each other, and if a line includes green, the green laser light source module 10a is preferably arranged on the upstream side.

Embodiment 3

Figure 4:
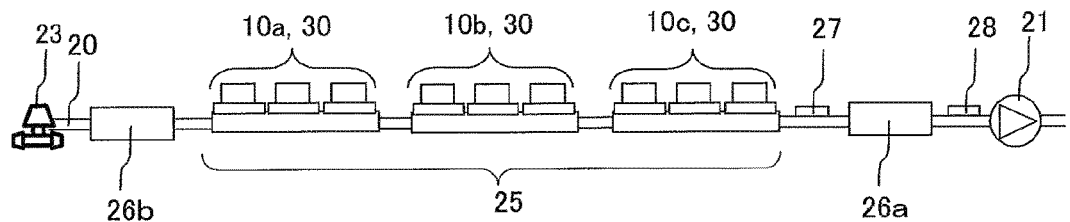
FIG. 4 is an enlarged view of main parts of a cooling apparatus provided in a light source apparatus according to Embodiment 3 of the present invention.

FIG. 4 is an enlarged view of main parts of the cooling apparatus 15 provided in the light source apparatus 90 according to Embodiment 3 of the present invention.

Now, Embodiment 3 of the present invention is described. Description of the same component as that of Embodiment 1 is omitted herein. The parts identical with or corresponding to those of Embodiment 1 are denoted b the same reference symbols.

In Embodiment 2 described above, a case is described in which one of a plurality of laser light source modules 10 is the green laser light source module 10a, and the green laser light source module 10a is arranged on the upstream side. In Embodiment 4, a case in which refrigerant to be sucked into the compressor 21 is turned into the vapor state by the heater 26 is described.

In Embodiment 3, as illustrated in FIG. 4, a heater 26a is provided between the evaporator 25 and the suction side of the compressor 21, and a heater 26b is provided between the evaporator 25 and the expansion valve 23. Further, a first temperature sensor 27 is provided between the evaporator 25 and the heater 26a, and a second temperature sensor 28 is provided between the heater 26a and the compressor 21.

The second temperature sensor 28 detects a suction temperature of the compressor 21, and the first temperature sensor 27 detects evaporating temperature (an outlet temperature of the evaporator 25 in Embodiment 3). The gas-liquid state of refrigerant to be sucked into the compressor 21 can be determined based on a difference between those temperatures. Thus, the heater 26 can be controlled such that refrigerant is caused to flow out of the evaporator 25 in the two-phase gas-liquid state in which the refrigerant is mainly in a liquid state, and becomes vapor on the suction side of the compressor 21. As a result, a temperature distribution of refrigerant in the evaporator 25 is uniformed, and hence the laser light source modules 10 can emit laser light with high stability, and have extended lives. In addition, refrigerant in the liquid state can be prevented from returning to the compressor 21, and hence the reliability of the compressor 21 is improved.

Further, the two heaters are used, that is, an evaporating temperature of refrigerant is adjusted by controlling the heater 26b on the upstream side, and refrigerant to be sucked into the compressor 21 is turned into the vapor state by controlling the heater 26a on the downstream side. The control can be performed more precisely than in a case of performing the control by one heater. The position of the first temperature sensor 27 (the detection position of evaporating temperature) is not limited to the position described above, and the first temperature sensor 27 may be provided at any position on the pipe 20 between an outlet of the expansion valve 23 to an outlet of the evaporator 25.

Embodiment 4

Figure 5:
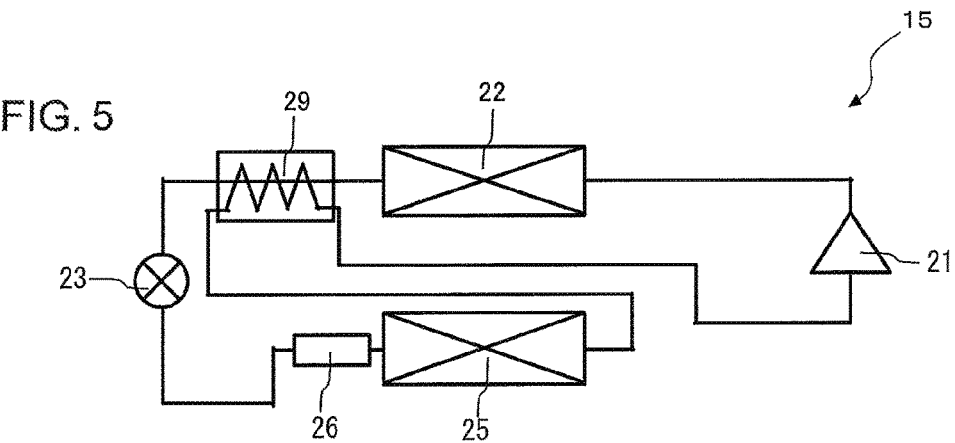
FIG. 5 is a refrigerant circuit diagram of a cooling apparatus provided in a light source apparatus according to Embodiment 4 of the present invention.

FIG. 5 is a refrigerant circuit diagram of the cooling apparatus 15 provided in the light source apparatus 90 according to Embodiment 4 of the present invention.

Now, Embodiment 4 of the present invention is described. Description of the same component as that of Embodiment 1 is omitted herein. The parts identical with or corresponding to those of Embodiment 1 are denoted by the same reference symbols.

In Embodiment 3 described above, a case is described in which refrigerant to be sucked into the compressor 21 is turned into the vapor state by controlling the heater 26. In Embodiment 4, a case is described in which refrigerant to be sucked into the compressor 21 is turned into vapor by heating refrigerant on the low-pressure side by a heat source on a high-pressure side.

In Embodiment 4, as illustrated in FIG. 5, a heat exchanger 29 is provided between the condenser 22 and the expansion valve 23. Further, the heater 26 is provided between the expansion valve 23 and the evaporator 25. Liquid refrigerant flowing out of the outlet of the condenser 22, which serves as a heat source, exchanges heat with refrigerant flowing out of the outlet of the evaporator 25 with the heat exchanger 29. In this manner, the refrigerant, which has been turned into vapor, can flow to the suction port of the compressor 21. Thus, an evaporating temperature of refrigerant can be adjusted by controlling the heater 26, and refrigerant to be sucked into the compressor 21 can be turned into the vapor state by controlling the heat exchanger 29.

In this way, the heat exchanger 29 is connected to the inlet side of the expansion valve 23 so that refrigerant flowing out of the outlet of the evaporator 25 can be heated by liquid refrigerant flowing out of the outlet of the condenser 22 with the heat exchanger 29, thereby turning refrigerant to be sucked into the compressor 21 into the vapor state.

As described above, when heat quantity of refrigerant itself is used to evaporate refrigerant flowing to the suction port of the compressor 21, heat quantity of the heater 26 can be reduced, leading to reduction in cost of the heater 26.

Further, the refrigerant temperature is decreased by latent heat of refrigerant, and hence temperatures of the laser light source modules 10 can be kept lower than in the related-art cooling systems using Peltier elements or water cooling. The laser diodes in the laser light source modules 10 have a characteristic that, as the light emitting portion temperatures of the laser diodes are lower, the lives thereof are longer. Thus, the light source apparatus 90 with higher reliability can be obtained.

In Embodiment 4, liquid refrigerant flowing out of the outlet of the condenser 22 serves as the heat source, but a discharge pipe of the compressor 21 on the discharge side may serve as the heat source. With this configuration, small heat quantity unlike heat quantity of condensed liquid can be obtained, and refrigerant flowing out of the outlet of the evaporator 25 is turned into vapor with this heat quantity because a temperature difference is large.

Further, a capillary may be provided instead of the expansion valve 23 and exchange heat with refrigerant flowing out of the outlet of the evaporator 25.

Embodiment 5

Now, Embodiment 5 of the present invention is described. Description of the same component as that of Embodiment 1 is omitted herein. The parts identical with or corresponding to those of Embodiment 1 are denoted by the same reference symbols.

In Embodiment 4 described above, a case is described in which refrigerant to be sucked into the compressor 21 is turned into the vapor state by heating refrigerant on the low-pressure side by the heat source on the high-pressure side. In Embodiment 6, a case is described in which the refrigerant temperature is adjusted by controlling the heater 26 such that a temperature of the evaporator 25 does not reach the dew point or less.

In Embodiment 5, as illustrated in FIG. 4, a refrigerant temperature detected by the first temperature sensor 27 is adjusted by the heater 26 so as not to reach the dew point or less, thereby enabling prevention of dew condensation on the pipe 20. Further, also when dew condensation occurs due to transitional operation of activating or stopping the cooling apparatus 15, the dew condensation can be prevented by controlling heat quantity of the heater 26 to increase the refrigerant temperature, thereby keeping temperatures of the evaporator 25 and the pipe 20 in the periphery of the evaporator 25 at values higher than the dew point.

For example, when the cooling apparatus 15 is activated, the operation of the refrigerant circuit is stabilized while keeping a temperature of the evaporator 25 at a value higher than the dew point. After that, as a heat generation amount of the laser light source modules 10 is increased, heat quantity of the heater 26 is reduced. When the cooling apparatus 15 is stopped, heat quantity of the heater 26 is increased while reducing a heat generation amount of the laser light source modules 10 such that heat is generated only by the heater 26. Then, the apparatus is stopped. Through such operation, dew condensation in the apparatus is prevented so that the lives of the laser light source modules 10 can be extended, and the apparatus with high reliability can be obtained.

Embodiment 6

Figure 6:
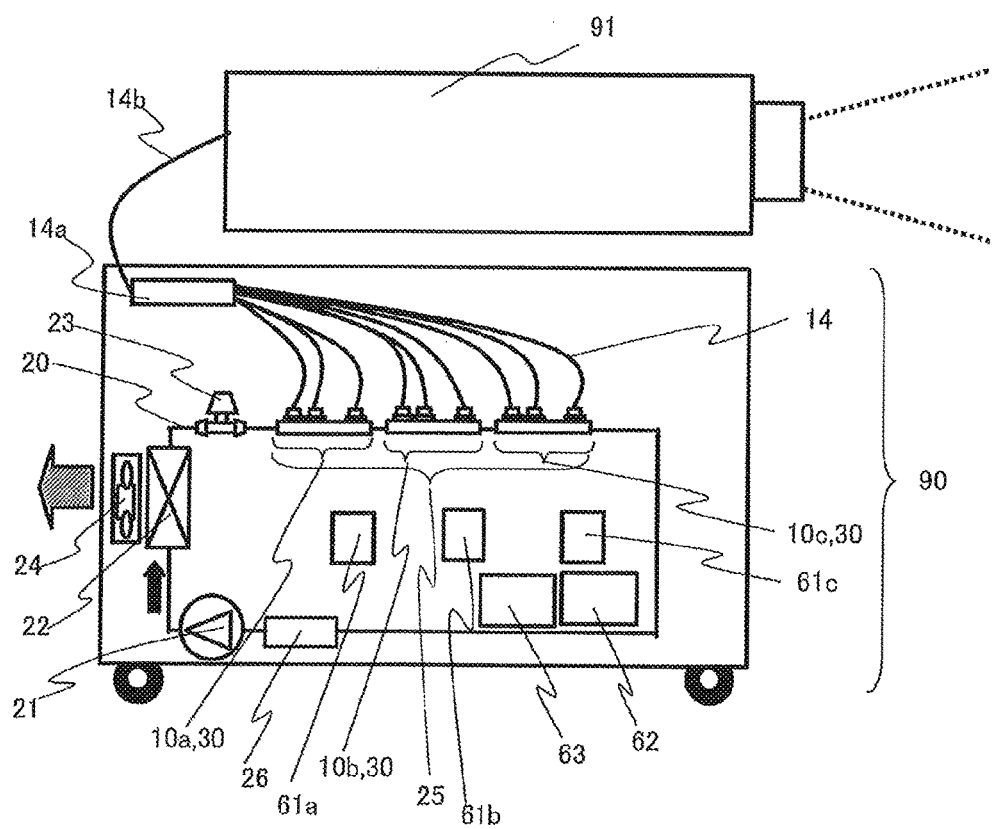
FIG. 6 is an overall configuration diagram of a projection-type image display apparatus including a light source apparatus according to Embodiment 6 of the present invention.

FIG. 6 is an overall configuration diagram of a projection-type image display apparatus 91 including the light source apparatus 90 according to Embodiment 6 of the present invention.

Now, Embodiment 6 is described. Description of the same component as that of Embodiment 1 is omitted herein. The parts identical with or corresponding to those of Embodiment 1 are denoted by the same reference symbols.

In Embodiment 5 described above, a case is described in which the refrigerant temperature is adjusted by controlling the heater 26 such that a temperature of the evaporator 25 does not reach the dew point or less. In Embodiment 6, the projection-type image display apparatus 91 including the light source apparatus 90 is described.

As illustrated in FIG. 6, the projection-type image display apparatus 91 according to Embodiment 6 is connected to the optical fiber collecting portion 14a of the light source apparatus 90 via the optical fiber bundle line 14b. The projection-type image display apparatus 91 includes a unit configured to generate image light through space modulation of laser light and a projection optical system configured to project the image light, and is configured to project images to the outside of the projector with the unit and the projection optical system.

The projection-type image display apparatus 91 according to Embodiment 6 can achieve high reliability, low cost, and high energy efficiency.

REFERENCE SIGNS LIST 10 laser light source module 10a green laser light source module 10b red laser light source module 10c blue laser light source module 12 electric terminal portion 13 optical unit 14 optical fiber 14a optical fiber collecting portion 14b optical fiber bundle line 15 cooling apparatus 20 pipe 21 compressor 22 condenser 23 expansion valve 24 fan 25 evaporator 26 heater 26a heater 26b heater 27 first temperature sensor 28 second temperature sensor 29 heat exchanger 30 heat block 60 electric board 61 laser light source driving circuit board 61a green laser light source driving circuit board 61b red laser light source driving circuit board
61c blue laser light source driving circuit board 62 power source circuit board 63 control circuit board 90 light source apparatus 91 projection-type image display apparatus

The invention claimed is:
1. An electronic apparatus comprising:
a cooling apparatus comprising
a refrigerant circuit in which a compressor, a condenser, an expansion valve and an evaporator are circularly connected sequentially, via a pipe, and refrigerant circulates, and
a heater provided to the refrigerant circuit; and
a controller configured to control at least the heater of the cooling apparatus,
the evaporator being thermally connected to an exothermic element,
the heater comprising heaters provided between the evaporator and a suction side of the compressor, and between the evaporator and the expansion valve, respectively,
the controller being configured to
control the heater to keep a temperature of the evaporator to be higher than a dew point,
control the heater provided between the evaporator and the expansion valve, to adjust a quality of refrigerant in a two-phase state, and
control the heater provided between the evaporator and the suction side of the compressor, to turn refrigerant to be sucked into the compressor into the vapor state.

2. The electronic apparatus of claim 1, wherein the evaporator comprises a segment of the pipe, the segment being positioned between the compressor and the expansion valve.

3. The electronic apparatus of claim 1, wherein the exothermic element comprises a laser light source module,
the evaporator comprises a heat block serving as a radiator, and
a segment of the pipe between the compressor and the expansion valve is thermally connected to the laser light source module via the heat block.

4. A projection-type image display apparatus, comprising the electronic apparatus of claim 1.

5. The electronic apparatus of claim 3, wherein the controller is configured to activate the compressor after activating the heater, and to activate the laser light source module after activating the compressor.

6. The electronic apparatus of claim 3, wherein the laser light source module comprises a green laser light source module configured to emit green laser light, and a unit laser light source module configured to emit laser light of another color, and
the green laser light source module is provided on an upstream side of the unit laser light source module.

7. The electronic apparatus of claim 3, wherein the laser light source module comprises a green laser light source module configured to emit green laser light, and a unit laser light source module configured to emit laser light of another color,
the unit laser light source module comprises at least two unit laser light source modules, and
the green laser light source module is provided on an upstream side of at least one of the at least two unit laser light source modules.

* * * * *